United States Patent [19]

Boyle, Jr.

[11] 4,409,283
[45] Oct. 11, 1983

[54] FORMABLE VISCID CAULKING MEMBER AND METHOD OF MAKING SAME

[76] Inventor: Donald E. Boyle, Jr., 11 Sullivan Rd., West Quincy, Mass. 02169

[21] Appl. No.: 342,133

[22] Filed: Jan. 25, 1982

[51] Int. Cl.³ .................. B65D 53/06; B65D 53/08
[52] U.S. Cl. ................................. 428/272; 57/232;
57/234; 57/250; 57/251; 156/71; 277/227;
277/229; 277/DIG. 6; 427/358; 427/398.3;
427/434.7; 427/443; 428/378; 428/394;
428/395; 428/396; 428/484
[58] Field of Search ............... 57/232, 234, 250, 251;
156/71; 428/378, 394, 396, 395, 484, 272;
427/358, 398.3, 434.7, 443; 277/227, 229, DIG. 6

[56] References Cited

U.S. PATENT DOCUMENTS

| | | | |
|---|---|---|---|
| 1,115,418 | 10/1914 | Eaton | 427/434.7 |
| 1,594,830 | 8/1926 | Gray et al. | 428/396 |
| 1,789,052 | 1/1931 | Pfanstiehl | 428/396 |
| 1,856,890 | 5/1932 | Stokes | 277/227 |
| 2,139,343 | 12/1938 | Williams et al. | 427/443 |
| 2,313,990 | 3/1943 | Crandell | 156/71 |
| 2,647,296 | 4/1953 | Shive | 427/434.7 |
| 2,698,269 | 12/1954 | Sussenbach | 277/229 |
| 2,817,225 | 12/1957 | Weglin | 427/443 |
| 2,915,110 | 12/1959 | Ferguson | 156/296 |
| 2,946,698 | 7/1960 | Brunnick et al. | 427/443 |
| 3,042,570 | 7/1962 | Bradt | 427/434.7 |
| 3,400,411 | 9/1968 | Harvey | 277/227 |
| 3,560,382 | 2/1971 | Finch | 428/484 |
| 3,672,974 | 6/1972 | Tomlinson | 427/434.7 |

FOREIGN PATENT DOCUMENTS 382623 10/1932 United Kingdom ............... 277/229

Primary Examiner—James C. Cannon

[57] ABSTRACT

A formable viscid caulking member including a viscid medium; a flexible multifilament member saturated with the viscid medium; and a method of making such a caulking member.

11 Claims, 5 Drawing Figures

FORMABLE VISCID CAULKING MEMBER AND METHOD OF MAKING SAME

FIELD OF INVENTION

This invention features a formable viscid caulking member which remains viscid virtually indefinitely.

BACKGROUND OF INVENTION

Cracks, gaps and voids are often found in buildings, especially around windows, doors and mouldings. Such cracks permit the entry of unwanted wind, moisture, and insects. These openings also allow heat to escape from the structure, which in view of increasing heating costs is particularly undesirable.

Various method have been devised to seal unwanted cracks. Sealants such as putty may be applied. However, these products tend to break apart, making them difficult to handle. Application requires devices such as a knife or caulking gun. Applying such materials is slow, often requires cleanup, and is difficult in hard-to-reach places. Additionally, such products eventually dry and harden and lose their ability to stick or adhere to a surface. This feature may lead to cracking and deterioration. Further, such drying reduces the product's shelf life.

Alternatively, sealing of cracks may be accomplished with pressure-sensitive tape. However, tapes are difficult to apply to cool or moist surfaces, frequently tangle, and cannot be applied smoothly in other than a straight direction. Tape is unsightly and frequently loses its adhesion through deterioration and presence of excessive moisture. Neither tape nor other adhesive products are practicably removable or capable of reapplication.

Another method of sealing such cracks is the use of foam rubber strips. This means is generally used in areas where adjacent surfaces apply pressure to the strip surface to effect a seal. These materials are relatively expensive and require the pressure of two surfaces to form an effective seal.

SUMMARY OF INVENTION

It is therefore an object of this invention to provide an inexpensive and improved formable viscid caulking member which seals or caulks cracks and voids, thus resisting the entry of drafts, moisture and insects and preventing heat loss.

It is a further object of this invention to provide a formable viscid caulking member which does not break apart during application and which may be simply applied by hand to both easy- and hard-to-reach surfaces.

It is a further object of this invention to provide a formable viscid caulking member which maintains its viscidity indefinitely, thus having an indefinite shelf life, and may be removed from areas to which applied without undue effort or damage, and may be re-applied if necessary.

It is a further object of this invention to provide such a formable viscid caulking member which may be applied to any clean surface excepting those containing solvents or oils which would render wax-based material non-adhering.

It is a further object of this invention to provide such a formable viscid caulking member which functions satisfactorily over wide temperature and humidity ranges.

The invention features a formable viscid caulking member including a viscid medium and a flexible multifilament element saturated with the viscid medium. The viscid medium may include a microcrystalline wax or a combination of microcrystalline wax and a refined scale wax. The combination may incude from 40% to 90% microcrystalline wax and, complementarily, from 60% to 10% refined scale wax.

The multifilament member is usually elongate and may include yarn or a fabric.

Additionally, the invention features a method of making a formable viscid member including immersing a length of flexible multifilament member in a melted viscid medium and allowing the multifilament member to reside therein in a slack condition to completely saturate the multifilament member with viscid medium. The member is then removed from the viscid medium and the saturated multifilament member is solidified.

In a preferred embodiment, solidifying is performed by immersing the saturated member in a cooling medium to bring the viscid medium to a solid state. Typically the multifilament member is drawn through the cooling medium. The formable viscid member may be completed by smoothing the surface of the saturated multifilament member such as by passing the member through a hole in a smoothing block or other device wherein at least a portion of the hole has a smaller diameter than that of the entering multifilament member.

This invention also features the formable viscid member made according to this method.

DISCLOSURE OF PREFERRED EMBODIMENT

Other objects, features and advantages will occur from the following description of a preferred embodiment and the accompanying drawings, in which.

Figure 1:
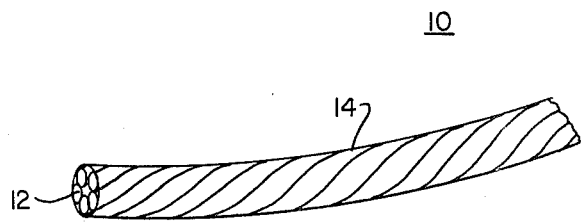
FIG. 1 is an axonometric view of a formable viscid caulking member according to this invention.

A formable viscid member according to this invention may be effected using a heated, liquid viscid medium. The viscid medium preferably includes a combination of microcrystalline wax and in addition may include a refined scale wax such as #7361 manufactured by Roger A. Reed Co., Inc., Reading, Mass. The percentage of microcrystalline wax may vary from 40% to 90%, and, complementarily, the refined scale wax may range from 60% to 10%. Increasing the amount of microcrystalline wax increases the medium's viscosity, whereas increasing the portion of refined scaled wax increases the medium's rigidity and decreases its formability.

The microcrystalline wax may be a non-resilient compound having a doubled-over chain structure with a melting point of approximately 140 degrees Farenheit and a needle penetration of 60 at 77 degrees F. The wax viscosity at 200 degrees F. may be approximately 80 and its specific gravity —0.82. The refined scaled wax may be of a fryable, coarse fibrous crystalline structure with a melting point of approximately 126 degrees F. Its viscosity at 210 degrees F. may be 40 and its oil content less than 5%.

Alternatively, the viscid medium may include solely microcrystalline wax or any similar viscid compound. Aliphatic hydrocarbon resins, homopolymers, copolymers and natural resins and fillers may be used in the medium or added to it so as to perform specific functions. For example, adding a pesticide to the medium creates a product for destroying insects at the point of household entry. Since microcrystalline waxes contain no solvents their viscosity continues indefinitely.

The formable viscid member also includes a flexible multifilament member saturated with the viscid medium. This member may be elongate and include a yarn or, alternatively, a similar fibrous fabric. A preferred yarn is a four-ply acrylic of approximately ¼ inch diameter in a dry wound state, similar to that manufactured by Atlanta Cotton Mills, Macon, Ga., or a four-ply polyester manufactured by Blue Mountain Industries, Blue Mountain, Ala.

The formable viscid caulking member so described may be used for adhering to at least one surface and in particular may be used to seal or caulk cracks, voids and gaps. It may be applied by hand, using finger pressure, although alternative mechanical means of application may be used. The member may be cut to any length to fit the required use and may be applied in layers to seal wide openings. The member may be applied to any surface which is preferably clean and free of solvents and oils. Such members operate under temperatures from −60 degrees F. to 120 degrees F. and under conditions of 20% to 200% humidity.

A method of making a formable viscid member according to this invention may include winding a length of flexible multifilament member on a first spool. The spool may be ⅝ inch in diameter and 10 inches in length. Upon this spool may be wrapped up to 970 feed of the multifilament member comprising a cylinder 8 inches long and 7 inches in diameter. The viscid medium should be maintained above its melting point. If the preferred medium of microcrystalline and refined scale wax is used this temperature may range from 170 degrees F. to 180 degrees F.

The multifilament member is unwound, typically continously, from the first spool at a speed of approximately 50 feet per minute and is drawn into the melted viscid medium and immersed therein in a relaxed and festooned condition until complete saturation of the member is accomplished. The saturated multifilament member is then withdrawn, typically longitudinally, from the melted viscid medium at a speed comparable to that at which the first spool is unwound. The member is then solidified such as by immersing it in a cooling medium. Preferably the multifilament member is drawn through the cooling medium, which may comprise a water or other liquid bath at a temperature of approximately 60 degrees Farenheit plus or minus 5 degrees, or in a chilled atmosphere of approximately 20 degrees F.

To smooth the surface and imbed any filaments protruding from the exterior surface of the member after cooling, the member may be drawn through a circular aperture of a block or other suitable structure. The aperture is slightly smaller in diameter than the rough, unsmoothed diameter of the saturated member after the cooling process. For example, if the cooled member is ¼ inch in diameter the aperture diameter may be 13/64 inch.

Figure 2:
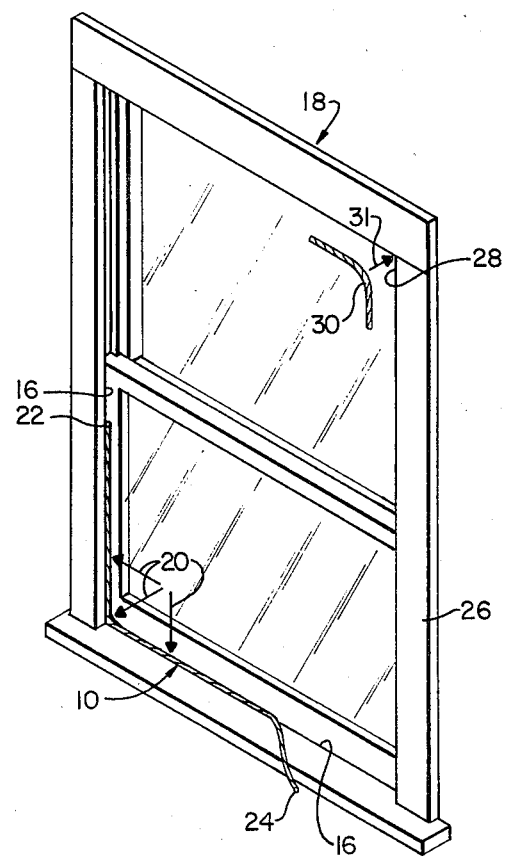
FIG. 2 is an axonometric illustration of the application of the formable viscid member of FIG. 1 to a crack in a window sash.

There is shown in FIG. 1 a formable viscid caulking member 10 which includes a multifilament member 12 and a viscid medium 14 saturated through the multifilament member, making the member sticky or adhesive. The formable viscid caulking member 10, FIG. 2, is inserted into the crack 16 of a window 18 by exerting finger pressure in the direction of arrows 20. End 22 of member 10 is fixed in place. End 24 remains to be fitted in crack 16. If a piece of sufficient length is used, member 10 can be continued to seal an opening or gap along side 26. Alternatively, if a crack exists at point 28 but not along the remainder of side 26, and consequently a continuous strip of member 10 is not required, a separate piece 30 can be cut from member 10 and used to seal crack 28 by inserting in the direction of arrow 31.

Figure 3:
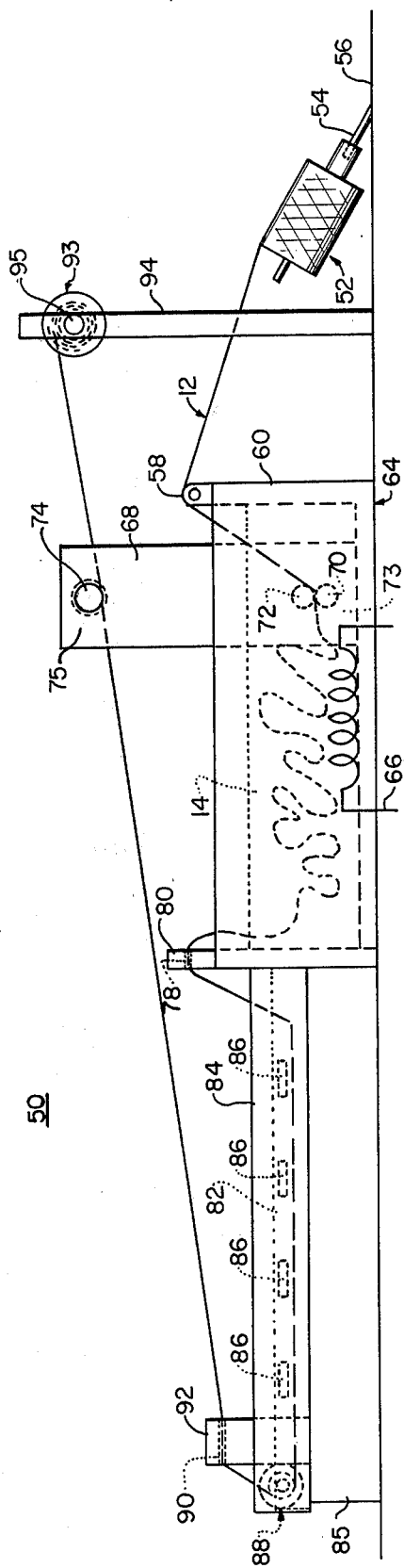
FIG. 3 is an elevational cross-sectional view of a device for making a formable viscid member according to this invention.
Figure 4:
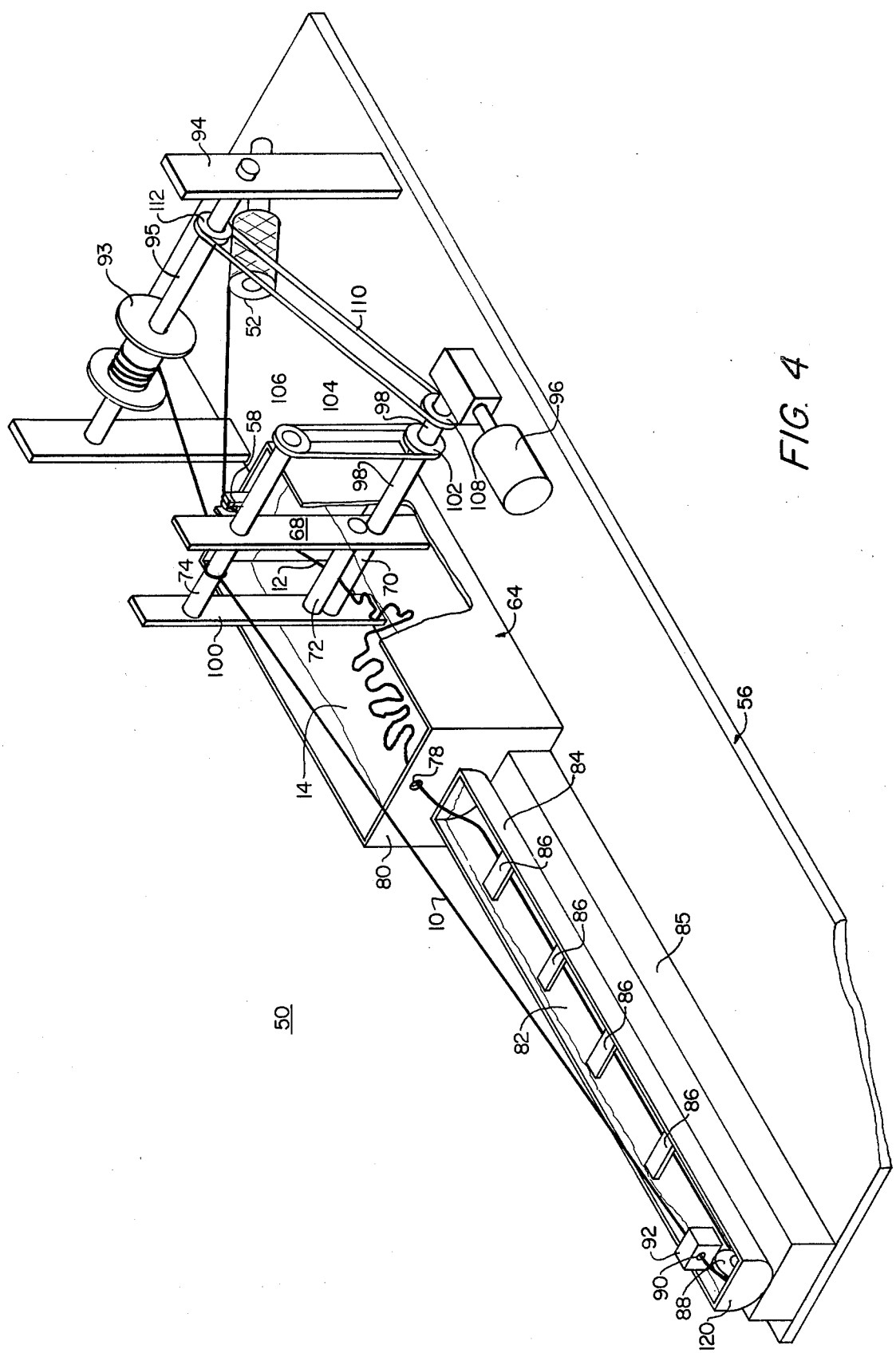
FIG. 4 is an axonometric view of the device of FIG. 3; and a method for making a formable viscid member according to this invention.

A method of making the formable viscid member utilizes a system 50, FIGS. 3 and 4. As shown in FIG. 3, multifilament member 12 is rolled on a spool 52 which is axially mounted to a support 54 projecting from a table 56 to allow for rotation of spool 52 and thus unwinding of multifilament member 12 therefrom.

A length of multifilament member 12 is fed over a pulley 58 mounted to a wall 60 of a vat 64 and into heated liquid viscid medium 14 contained in vat 64. Medium 14 is heated to maintain a liquid state by heater 66. A pair of support members (of which only member 68 is shown in FIG. 3) are mounted side by side to the inside bottom of vat 64 and extend above the vat. Means for mounting these support members may incude brackets, welding, epoxy, or any comparable means. A pair of pinch rollers 70, 72 are mounted between the lower portions 73 of the support members, and an axle 74 is rotatably mounted between the upper portions 75 of the support members. Member 12 passes through pinch rollers 70 and 72 and extends in a slack manner so as to maintain a festooned configuration through medium 14, thereafter exiting vat 64 through hole 78 in wall 80.

Multifilament member 12 is then disposed through a cooling medium 82, such as water, contained in trough 84 which is seated on a ledge 85, passing therein beneath longitudinally spaced brackets 86. After being fed around pulley 88 and through hole 90 in block 92, member 12 is looped around axle 74 and terminates by winding upon a takeup spool 93 which is rotatably mounted to post 94 by a shaft 95.

A motor 96, FIG. 4, is provided for driving multifilament element 12 through system 50. In particular, motor 96 rotatably drives a shaft 98 which in turn rotatably operates roller 70. Typically roller 70 is simply a section of shaft 98 extending between support members 68 and 100. Alternatively, roller 70 may be distinct from shaft 98 and interconnected to and driven by the shaft. As roller 70 is driven by motor 96, multifilament member 12 is drawn between rollers 70 and 72 and is thus unwound from spool 52 and drawn over pulley 54 and into viscid medium 14, where it is saturated.

Motor 96 also operates to withdraw saturated member 12 from viscid medium 14: a pulley 102 is mounted to rotate with shaft 98 and is interconnected by a belt 104 to a pulley 106 mounted to rotate with axle 74. Likewise, a pulley 108 mounted to rotate with shaft 98 is interconnected by a belt 110 to a pulley 112 mounted to rotate with shaft 95, to which takeup spool 52 is axially mounted. Thus, as shaft 98 is driven by motor 96, the belt and pulley mechanisms drive axle 74 and shaft 95, withdrawing saturated member 12 from viscid medium 14 and winding it onto takeup spool 93.

After passing through rollers 70 and 72, member 12 travels through medium 14 in a slack, relaxed condition. Because the fibers of member 12 are loose and relaxed, they are optimally saturated by the heated viscid medium 14. The slack condition of multifilament member 12 within medium 14 is maintained by feeding an initial length of element 12 through medium 14 in such a slackened condition. By using shafts, axles, rollers and pulleys of proper diameters, the rate at which member 12 is fed into medium 14 can be set substantially equal to the rate at which it is withdrawn. The multifilament member 12 thus maintains a relaxed, rather than tensioned, condition following passage through rollers 70 and 72, and optimal saturation is thereby achieved.

The saturated member 12 is withdrawn from vat 64 through hole 78 in wall 80 and is drawn into and through cooling fluid 82, which cools and thus solidifies the saturated multifilament member. Spaced brackets 86, extending the width of trough 84, and mounted in any acceptable manner to the sides thereof, keep member 12 submerged in the cooling fluid for substantially the length of the trough. At the end 120 of trough 84, member 12 is drawn around a pulley 88 and through a hole 90 in block 92. At least a portion of the diameter of hole 90 is smaller than the diameter of the entering saturated element 12. Thus the diameter of element 12 is reduced in size and smoothed before passing through hole 90. Upon exiting block 91, as illustrated in FIG. 4, the now viscid member 10 is drawn to and around rotating axle 74, and is finally wound onto rotating spool 93. The entire system 50 is placed on a table 56.

Figure 5:
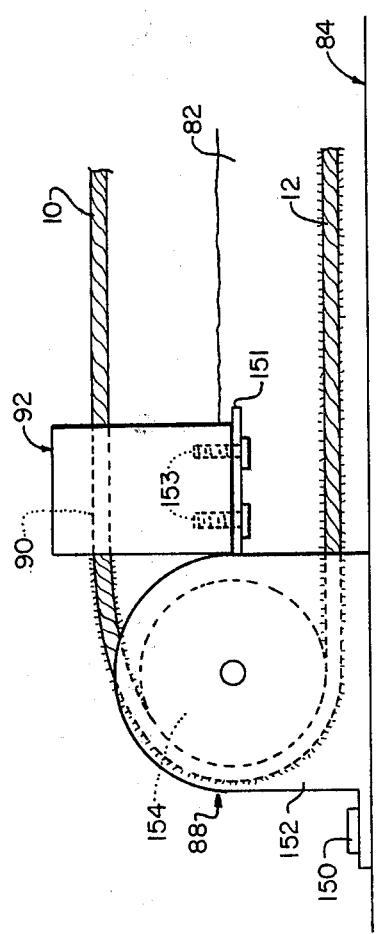
FIG. 5 is a cross-sectional view of a smoothing block for smoothing a formable viscid member.

The manner of smoothing saturated member 12 is shown more clearly in FIG. 5. Pulley 88 is fixed, such as by screw 150, to the base of trough 84. Smoothing block 92 is fixed to an extension 151 of housing 152 of pulley 88 by bolts 153 by adhesive or comparable means. After passing through cooling medium 82, saturated multifilament member 12 having a coarse surface is drawn around pulley wheel 154 and into hole 90 of block 92. Because the diameter of hole 90 is less than that of coarse-surfaced entering member 12, the member is reduced in diameter and smoothed during passage through hole 90, exiting therefrom as viscid member 10.

Other embodiments will occur to those skilled in the art and are within the following claims:

What is claimed is:

1. A formable viscid caulking member comprising: a viscid medium including 40% to 90% microcrystalline wax and, complementarily, from 60% to 10% refined scale wax; and a flexible multifilament member saturated with said viscid medium.

2. The viscid caulking member of claim 1 in which said multifilament member includes a fabric.

3. The viscid caulking member of claim 1 in which said multifilament member is elongate.

4. A formable viscid caulking member comprising: a viscid medium which includes a microcrystalline wax and a substance selected from the group including aliphatic hydrocarbon resins, homopolymers, copolymers, natural resins and natural fillers; and a flexible multifilament member saturated with said viscid medium.

5. The viscid caulking member of claim 4 in which said substance includes a pesticide.

6. A method for making a formable viscid caulking member comprising:
    immersing a length of flexible, multifilament member in a heated liquid viscid medium including a microcrystalline wax and a substance selected from the group consisting of refined scale wax, aliphatic hydrocarbon resins, homopolymers, copolymers, natural resins and natural fillers and allowing said multifilament member to reside therein in a relaxed condition to saturate said multifilament member with viscid medium;
    withdrawing said saturated multifilament member from said heated liquid viscid medium;
    solidifying said saturated multifilament member; and
    winding the solidified saturated multifilament member on a spool.

7. The method of claim 6 in which said solidifying includes immersing said saturated multifilament member in a cooling medium.

8. The method of claim 7 in which said solidifying includes longitudinally drawing said multifilament member through said cooling system.

9. The method of claim 6 further including smoothing the surface of the dried multifilament member.

10. The method of claim 9 in which said smoothing includes longitudinally drawing said multifilament member through a hole in a smoothing device, said hole having a smaller diameter than that of the entering multifilament member.

11. The formable viscid member made according to the method of claim 6.

* * * * *